April 8, 1947.                 W. H. T. HOLDEN ET AL                   2,418,471
                                DIRECT CURRENT GENERATOR
                            Filed July 12, 1944        2 Sheets—Sheet 1
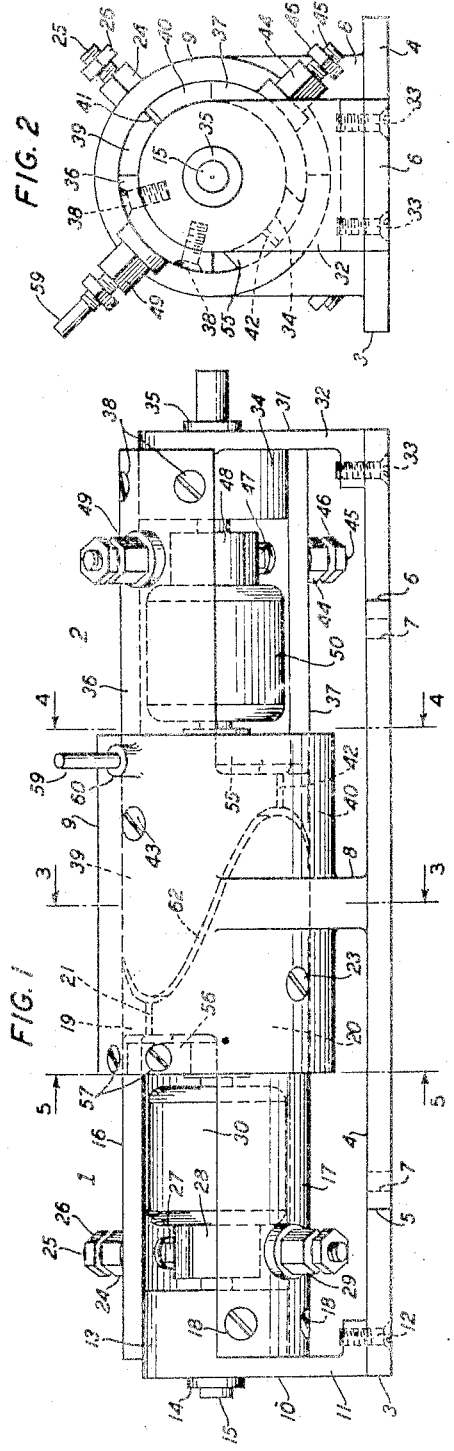
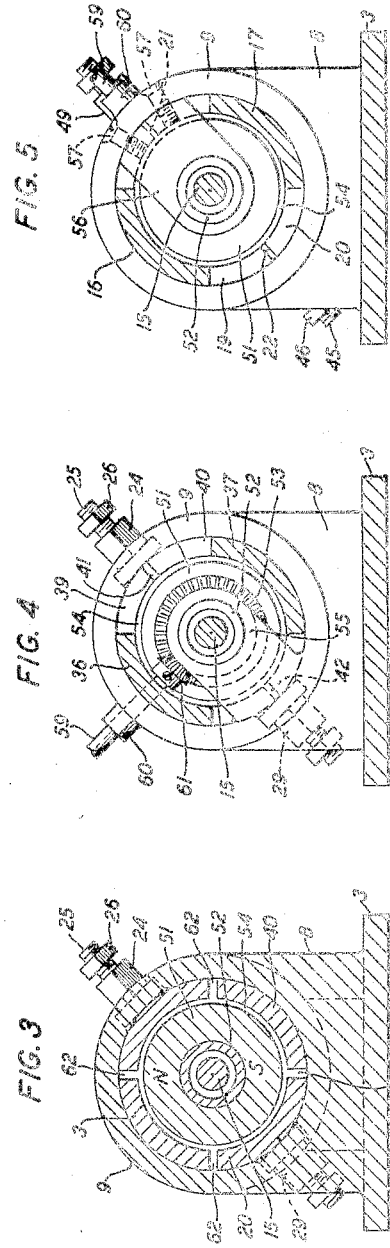
INVENTORS  W. H. T. HOLDEN
           E. R. MORTON
BY         P. C. Smith
                        ATTORNEY INVENTORS W. H. T. HOLDEN
E. R. MORTON
BY P. C. Smith

ATTORNEY

Patented Apr. 8, 1947

2,418,471

UNITED STATES PATENT OFFICE 2,418,471

DIRECT-CURRENT GENERATOR

William H. T. Holden, Woodside, and Edmund R. Morton, Brooklyn, N. Y., assignors to Bell Telephone Laboratories, Incorporated, New York, N. Y., a corporation of New York Application July 12, 1944, Serial No. 544,534

10 Claims. (Cl. 171—209)

1

This invention relates to a direct current generator and more particularly to a generator which is capable of generating a potential which may be varied at will in accordance with a trigonometric function of an angle.

It is often desirable to produce a potential which may be varied in accordance with a trigonometric function of an angle as for instance in accordance with the sine or cosine of an angle. An alternating current potential may be so varied through the use of a magnetic resolver having two stator windings positioned in quadrature and a rotor winding to which the potential which is to be resolved is applied and which rotor is rotatable through a desired angle, whereby a potential is derived from one stator winding which is a function of the potential applied to the rotor winding and the sine of the angle through which the rotor is rotated and whereby a potential is derived from the other stator winding which is a function of the potential applied to the rotor winding and the cosine of the angle through which the rotor is rotated.

Another manner in which a sine or cosine derivative of either a direct or alternating current potential may be secured is by means of a potentiometer, the winding of which is wound on a card which is so shaped that as the associated brush is moved over the winding to an amount commensurate with an angular displacement, the potential derived at the point of engagement of the brush with the winding will vary in accordance with either the sine or cosine of the angular displacement of the brush dependent upon whether the winding is wound for the derivation of a sine or of a cosine function of the potential applied across the potentiometer winding.

In the application of W. H. T. Holden Serial No. 527,999, filed March 24, 1944, a direct current generator has been disclosed from generating a potential which may be varied in accordance with the sine and cosine of an angle. In this generator, this is accomplished by the provision of two pairs of brushes positioned in quadrature with respect to each other. The brushes may be mounted in a carrier rotatable with respect to the generator frame or preferably the brushes are fixedly mounted on the generator frame and the field of the generator is rotatable with respect thereto. With a generator thus constructed, it has been found that when the displacement of the brushes with respect to the polar axis of the field is equal to an angle, then

2 a potential may be derived across one pair of brushes which varies in accordance with the sine of the angle and a potential may be derived across the other pair of brushes which varies in accordance with the cosine of the angle. In that application, the generator is employed as the master generator of an air position indicator, the generator being driven from the air mileage unit of the airplane at a speed which is commensurate with the air speed of the airplane and generating a potential across its polar axis equal to $E_0$ and a motor is operated to orient the brushes with respect to such polar axis through an angle $C_N$ equal to the true compass angle of the flight, whereby the potential $E_s$ appearing across one pair of brushes is equal to $E_0 \sin C_N$ and the potential $E_c$ appearing across the other pair of brushes is equal to $E_0 \cos C_N$.

It is the object of the present invention to provide a direct current generator of the general type above described but of simpler construction and whereby the derived potentials more accurately follow the sine and cosine functions of a varying angle.

One feature of the invention is the assemblage into a unified structure of two bipolar generators, the field pole-pieces and brushes of one generator unit being positioned in quadrature with respect to the field pole-pieces and brushes of the other generator unit and with the corresponding ends of the pole-pieces of the two units positioned adjacent to each other and magnetizable by a rotatable permanent magnet whereby the magnet produces magnetization for the fields of both units of the generator assembly, the intensities of which fields are varied one in accordance with the sine of the angle through which the magnet is rotated and the other in accordance with the cosine of the angle.

A further feature of the invention resides in the shaping of the ends of the pole-pieces in such a manner that the sine and cosine potentials generated by the two generator units vary accurately with the sine and cosine functions of the angle through which the permanent magnet is rotated with respect to the polar axes of the generators.

For a clearer understanding of the invention and the mode of its operation, reference may be had to the following detailed description thereof when read in connection with the accompanying drawings in which:

Fig. 1 is a side elevational view of the generator assembly of the present invention;

Fig. 2 is an end elevational view of the generator assembly;

Fig. 3 is a cross-sectional view taken along section line 3—3 of Fig. 1;

Fig. 4 is a cross-sectional view taken along section line 4—4 of Fig. 1;

Fig. 5 is a cross-sectional view taken along section line 5—5 of Fig. 1;

Figure 6:
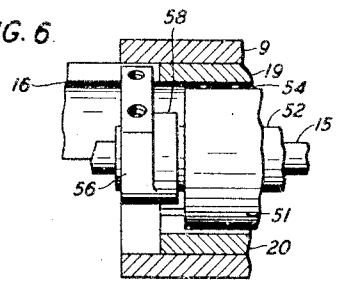
Fig. 6 is a fragmentary view, partly in cross-section, showing the manner in which the permanent magnet which magnetizes the fields of the generator units is rotatably mounted.

As previously stated the generator assemblage in accordance with the present invention is essentially an assemblage of two generator units having their rotors mounted on the same shaft and having their fields magnetically excited by a common permanent magnet. Referring particularly to Fig. 1, the two generator units 1 and 2 are mounted on a common base 3 of non-magnetic material comprising a mounting plate 4, the ends of which are reduced at 5 and 6 to enable better access to the brush holders. The plate 4 is provided with holes 7 through which bolts or screws may be inserted for securing the generator assemblage to any desired support. At its central portion, the base 3 is provided with a web 8 extending at right angles from the plate 4 and having a tubular portion 9 formed integrally therewith with its axis extending parallel to the plate 4.

The generator unit 1 comprises an end-supporting bracket 10 of non-magnetic material having an L-shaped base 11, the horizontal arm of which is secured to one end of the plate 4 by screws 12 and the vertical arm of which terminates in a cylindrical hub member 13. The member 13 has supported therein a ball bearing raceway 14, the axis of which is aligned with the axis of the tubular portion 9 of the base member 3. The ball-bearing raceway serves as a support for one end of the rotor shaft 15.

The two soft iron field pole members 16 and 17 of the generator unit 1 are secured to diametrically opposite portions of the peripheral surface of the hub member 13 by screws 18. The inner ends of these pole members are widened out as best disclosed in Fig. 8 and as indicated by the dotted lines in Fig. 1 to form pole-pieces 19 and 20, the adjacent edges of which are separated by narrow air-gaps 21 and 22. The pole members 16 and 17 are secured to the inner surface of the tubular portion 9 of the base 3 by screws 23.

Insulatedly supported in the pole member 16 adjacent to the outer end thereof is a brush holder 24 terminating in a threaded portion 25 on which is threaded a clamping nut 26 whereby a lead wire may be connected to the brush holder. A brush 27 is slidably supported in the brush holder, the inner end of which brush is forced into engagement with the rotor commutator 28 by the usual spring (not shown) which is interposed between the outer end of the brush and the outer end wall of the chamber within the holder 24. A similar brush holder 29 is insulatedly supported in the pole member 17 adjacent to its outer end.

Secured to the shaft 15 and rotatable within the pole members 16 and 17 is a rotor 30 having a commutator 28.

The generator unit 2 is identical in construction to the unit 1 and comprises an end supporting bracket 31 of non-magnetic material having an L-shaped base 32, the horizontal arm of which is secured to one end of the plate 4 by the screws 33 and the vertical arm of which terminates in a cylindrical hub member 34. The member 34 has supported therein a ball-bearing raceway 35, the axis of which is aligned with the axis of the tubular portion 9 of the base member 3. The ball-bearing raceway serves as a support for one end of the rotor shaft 15.

The two soft iron field pole members 36 and 37 of the generator unit 2 are secured to diametrically opposite portions of the peripheral surface of the hub member 34 by screws 38. The inner ends of these pole-piece members are widened out as best disclosed in Fig. 8 and as indicated by the dotted lines in Fig. 1 to form pole-pieces 39 and 40, the adjacent edges of which are separated by narrow air-gaps 41 and 42. The pole members 36 and 37 are secured to the inner surface of the tubular portion 9 of the base 3 by screws 43.

Insulatedly supported in the pole member 37 adjacent to its outer end is a brush holder 44 terminating in a threaded portion 45 on which is threaded a clamping nut 46 whereby a lead wire may be connected to the brush holder. A brush 47 is slidably supported in the brush holder, the inner end of which brush is forced into engagement with the rotor commutator 48 by the usual spring (not shown) which is interposed between the outer end of the brush and the outer end wall of the chamber within the holder 44. A similar brush holder 49 is insulatedly supported in the pole-piece member 36 adjacent to its outer end.

Secured to the shaft 15 and rotatable within the pole members 36 and 37 is a rotor 50 having a commutator 48.

Figure 7:
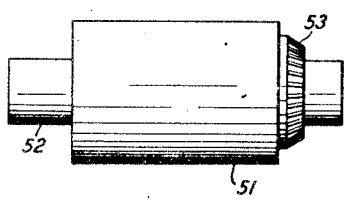
Fig. 7 is a detailed view of the permanent magnet.

Positioned within the pole-pieces 19, 20, 39 and 40 is a cylindrical permanent magnet 51. The magnet, disclosed in detail in Fig. 7, is magnetized more or less uniformly with one polarity over one half of its circumference and with the opposite polarity over the other half of its circumference and has a tubular sleeve 52 of non-magnetic material extending axially therethrough, said magnet being non-rotatably secured to the sleeve in any suitable manner. Secured to the sleeve adjacent to one end of the magnet or formed integrally with the sleeve is a bevel gear 53. The magnet and its assembled sleeve and gear are rotatably supported within the pole-pieces 19, 20, 39 and 40 with the peripheral surface of the magnet separated from the inner arcuate surfaces of the pole-pieces by a narrow air-gap 54 as seen in Figs. 3, 4 and 5.

For rotatably supporting the magnet 51, the tubular portion 9 of the base 3 is provided at its opposite ends with inwardly and radially extending ears 55 and 56. The ear 55 may be formed integrally with the tubular portion 9 or if desired may be formed separately therefrom and secured thereto by screws. The ear 56 is secured to the portion 9 by screws 57. Each of the ears 55 and 56 is provided at its inner end with a hub portion 58, as disclosed in Fig. 6, which has a hole therethrough, the axis of which is aligned with the axis of the tubular portion 9, for journalling one end of the sleeve 52 on which the magnet 51 is secured. In assembling the magnet 51 within the pole-pieces of the pole-piece members 19, 20, 39 and 40, the gear end of the sleeve 52 is inserted through the bearing hole in the ear 55 until the face of the gear 53 lies adjacent to the inner face of the ear, then the ear 56 is placed in position with the other end of the sleeve 52 extending through the bearing hole thereof, and the ear 56 is then secured to the tubular portion 9 by the screws 57.

For rotating the magnet 51 with respect to the pole-pieces, a pinion gear 61 is meshed with the gear 53 and is mounted on a shaft 59. The shaft 59 is journaled in an embossment 60 formed on the tubular portion 9 of the base 3 and may be driven by any suitable means.

To enable the shaft 59 and the magnet 51 to be turned easily, a ball or roller bearing may be provided for shaft 59 in the embossment 60 and ball-bearings may be provided on the ears 55 and 56 for journalling the ends of the sleeve 52.

The rotors 30 and 50 of the two generator units are secured to the shaft 15. One of the rotors is detachably secured to the shaft to enable the shaft to be inserted through the sleeve 52 on which the magnet 51 is mounted. The shaft when assembled in the ball-bearing raceways 14 and 35 extends freely through the sleeve 52.

Figure 8:
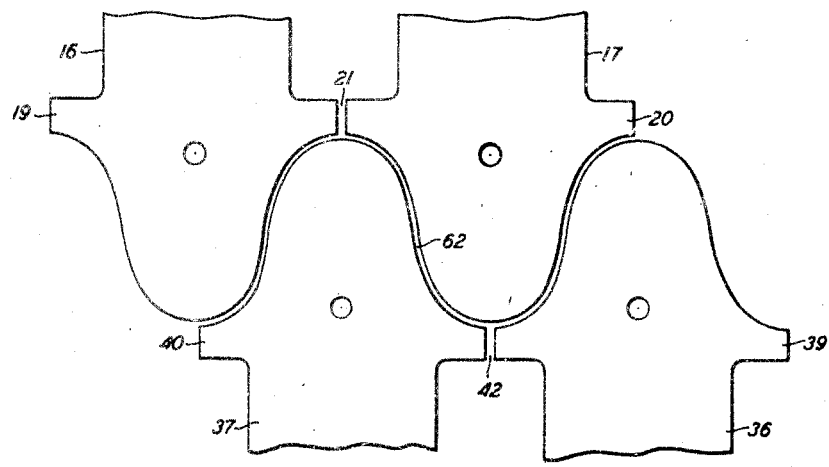
Fig. 8 shows the manner in which the abutting ends of the field pole-pieces of the two generator units are shaped and interposed.

The abutting pole-pieces 19, 20, 39 and 40 are shaped substantially as disclosed in Fig. 8, which figure illustrates a development of the four semi-cylindrical pole-pieces and the manner in which the two pole-pieces 19 and 20 of the generator unit 1 are disposed with respect to the pole-pieces 39 and 40 of the generator unit 2. It will be noted that the pole-pieces 19 and 20 are separated from the pole-pieces 39 and 40 by a sinusoidal air-gap 62 which crosses the section line 3—3 at four points as disclosed in Fig. 3.

The generator functions in the following manner: It will be assumed that the permanent magnet 51 is rotated to a position in which its polar axis is aligned with the polar axis extending through the pole-members 16 and 17 and through the brushes of the generator unit 1. Since the polar axis of the generator unit 2 is positioned in quadrature to the polar axis of the generator unit 1, the polar axis of the permanent magnet 51 will be 90 degres out of positional phase with the polar axis of the generator unit 2. Under this condition a maximum excitation of the field of generator unit 1 and a minimum excitation of the field of generator unit 2 will result. If the shaft 15 is now rotated, thereby rotating the rotors 30 and 50 of the generator units 1 and 2, respectively, the generator unit 1 will generate a potential $E_1$ which is the maximum for the speed of rotation of its rotor 30 and the generator unit 2 not having its field excited by the magnet 51 will generate no potential.

If the magnet 51 is rotated to a position in which its polar axis is aligned with the polar axis extending through the pole members 36 and 37 and through the brushes of the generator unit 2, then the polar axis to the magnet will be 90 degrees out of positional phase with the polar axis of the generator unit 1 and under this condition a maximum excitation of the field of generator unit 2 and the minimum excitation of the field of generator unit 1 will result. Consequently, when the rotors 30 and 50 are rotated, the generator unit 2 will generate a potential $E_2$ which is the maximum for the speed of rotation of its rotor 50 and the generator unit 1 not having its field excited by the magnet 51 will generate no potential.

It will now be assumed that through the shaft 59 and the gears 61 and 53, the magnet 51 is rotated in a clockwise direction as viewed in Fig. 4, from the position in which its polar axis is coincident with the polar axis of the generator unit 1, through the angle $\theta$. The polar axis of the magnet 51 will now move away from coincidence with the polar axis of generator unit 1 and toward the polar axis of the generator unit 2, whereby the excitation of the field of generator unit 1 is decreased and the excitation of the field of generator unit 2 is increased from zero in a positive direction. The potential generator by the generator unit 1 may be expressed in terms of the maximum potential generated at the driven speed when the angle $\theta$ was zero, as $E_3 = E_1 \sin \theta$ and the potential generated by the generator unit 2 may be expressed in terms of the maximum potential generated thereby at the driven speed when the angle $\theta$ was 90 degrees as $E_4 = E_2 \cos \theta$. Thus when the angle $\theta$ equals zero, the potential $E_3$ will be equal to $E_1$ and the potential $E_4$ will be zero and as the angle $\theta$ increases toward 90 degrees potential $E_3$ will decrease until when the angle $\theta$ becomes 90 degrees the potential $E_3$ will be zero and the potential $E_4$ will increase until when the angle $\theta$ becomes 90 degrees, the potential $E_4$ will be equal to $E_2$.

As the magnet 51 is further rotated so that the angle $\theta$ increases from 90 degrees toward 180 degrees, the excitation of the field of generator unit 2 still remains positive but decreases and the excitation of the field of generator unit 1 is increased negatively from zero to a maximum whereby the potential $E_4$ or $E_2 \cos \theta$ remains positive, but the potential $E_3$ or $E_1 \sin \theta$ becomes negative. As the magnet 51 is further rotated so that the angle $\theta$ increases from 180 degrees toward 270 degrees, the excitation of the field of generator unit 1 still remains negative but decreases and the excitation of the field of generator unit 2 is increased negatively from zero to a maximum whereby the potential $E_3$ or $E_1 \sin \theta$ decreases from a negative value to zero and the potential $E_4$ or $E_2 \cos \theta$ increases from zero to a maximum negative value. As the magnet 51 is still further rotated from 270 degrees toward 360 degrees, the excitation of the field of generator unit 2 still remains negative but decreases and the excitation of the field of generator unit 1 is increased positively from zero to a maximum whereby the potential $E_4$ or $E_2 \cos \theta$ decreases from a negative value to zero and the potential $E_3$ or $E_1 \sin \theta$ increases from zero to a maximum positive value.

A generator assembly of the type just described has particular utility in an air position indicator of the type disclosed in the application of W. H. T. Holden hereinbefore referred to. When used in a system of that type, the generator shaft 15 would be driven from the air mileage unit of the airplane so that the generator units would both generate reference potentials commensurate with the air speed of the airplane and the shaft 59 would be operated by the compass servo-motor to orient magnet 51 in accordance with the true compass course angle of the airplane flight. This use of the generator assembly is to be considered only as illustrative and not limiting it in any manner to such specific use.

What is claimed is:

1. A generator for generating a potential which may be caused to vary in accordance with a trigonometric function of an angle comprising a pair of soft iron pole-pieces, a rotor rotatable between said pole-pieces, each of said pole-pieces having a semi-cylindrically enlarged portion at one end thereof, the adjacent edges of which portions are separated by narrow air-gaps, and a permanent magnet for magnetizing said pole-pieces and rotatable with respect to the enlarged portions thereof through the angle for which the variable potential is desired.

2. A generator for generating a potential which may be caused to vary in accordance with a trigonometric function of an angle comprising a pair of soft iron pole-pieces, a rotor rotatable between said pole-pieces, each of said pole-pieces having a semi-cylindrically enlarged portion at one end thereof, the adjacent edges of which portions are separated by narrow air-gaps, and a cylindrical diametrically magnetized permanent magnet rotatable within said enlarged portions through the angle for which the variable potential is desired.

3. A generator for generating a potential which may be caused to vary in accordance with a trigonometric function of an angle comprising a pair of soft iron pole-pieces, a rotor rotatable between said pole-pieces, a commutator brush holder mounted on each of said pole-pieces, a brush carried by each of said holders for co-operation with the commutator of said rotor, each of said pole-pieces having a semicylindrically enlarged portion at one end thereof, the adjacent edges of which portions are separated by narrow air-gaps and a cylindrical diametrically magnetized permanent magnet rotatable within said enlarged portions through the angle for which the variable potential is desired.

4. A generator for generating a potential which may be caused to vary in accordance with a trigonometric function of an angle comprising a mounting plate, a cylindrical hub member secured to said plate at one end thereof, a tubular member secured to said plate having its axis aligned with the axis of said hub portion, a pair of soft iron pole-pieces each secured at one end to the peripheral surface of said hub member and at its other end to the inner surface of said tubular member, a rotor mounted for rotation within said pole-pieces, each of said pole-pieces having a semicylindrically enlarged portion at the end secured to said tubular member, the adjacent edges of which portions are separated by narrow air-gaps, and a cylindrical diametrically magnetized permanent magnet rotatable within said enlarged portions through the angle for which the variable potential is desired.

5. A generator for generating a potential which may be caused to vary in accordance with a trigonometric function of an angle comprising a pair of soft iron pole-pieces, a rotor rotatable between said pole-pieces, each of said pole-pieces having a semicylindrically enlarged portion at one end thereof, the adjacent edges of which portions are separated by narrow air-gaps, and a cylindrical diametrically magnetized permanent magnet rotatable within said enlarged portions through the angle for which the variable potential is desired, the ends of said enlarged portions being so shaped as to cause the generated potential to be varied by the rotation of said magnet in accordance with the trigonometric function of the angle through which said permanent magnet is rotated.

6. A generator for generating a potential which may be caused to vary in accordance with the sine and cosine of an angle comprising a mounting plate, two pairs of soft iron pole-pieces secured to said plate, one of said pairs being positioned in quadrature with respect to the other pair, a rotor shaft rotatably supported on said plate, a first rotor on said shaft for rotation within one pair of said pole-pieces, a second rotor on said shaft for rotation within the other pair of said pole-pieces, and a permanent magnet rotatable within both of said pairs of pole-pieces through a desired angle, whereby the rotation of one of said rotors generates a potential which varies in accordance with the sine of said angle and the rotation of the other of said rotors generates a potential which varies in accordance with the cosine of said angle.

7. A generator for generating potentials which may be caused to vary in accordance with the sine and cosine of an angle comprising a mounting plate, two pairs of soft iron pole-pieces secured to said plate and extending toward each other, one of said pairs being positioned in quadrature with respect to the other of said pairs and with the ends of the pole-pieces of one pair interposed between the adjacent ends of the pole pieces of the other pair, a rotor shaft rotatably supported on said plate, a first rotor on said shaft for rotation within one pair of said pole-pieces, a second rotor on said shaft rotatable within the other pair of said pole-pieces, and a permanent magnet rotatable within the interposed ends of all of said pole-pieces through a desired angle, whereby the rotation of one of said rotors generates a potential which varies in accordance with the sine of said angle and the rotation of the other of said rotors generates a potential which varies in accordance with the cosine of said angle.

8. A generator for generating potentials which may be caused to vary in accordance with the sine and cosine of an angle comprising a mounting plate, two pairs of soft iron pole-pieces secured to said plate and extending toward each other, one of said pairs being positioned in quadrature with respect to the other pair, each of said pole-pieces having an enlarged pole portion and the enlarged pole portions of one of said pairs being interposed between the enlarged pole portions of the other pair and separated therefrom by narrow air-gaps, a rotor shaft rotatably supported on said plate, a first rotor on said shaft for rotation within one pair of said pole-pieces, a second rotor on said shaft rotatable within the other pair of said pole-pieces, and a permanent magnet rotatable within the interposed enlarged portions of said pole-pieces through a desired angle, whereby the rotation of one of said rotors generates a potential which varies in accordance with the sine of said angle and the rotation of the other of said rotors generates a potential which varies in accordance with the cosine of said angle.

9. A generator for generating potentials which may be caused to vary in accordance with the sine and cosine of an angle comprising a mounting plate, two pairs of soft iron pole-pieces secured to said plate and extending toward each other, one of said pairs being positioned in quadrature with respect to the other pair, each of said pole-pieces having a substantially sinusoidally shaped pole portion and the pole portions of one of said pairs being interposed between the pole portions of the other of said pairs and separated therefrom by a narrow sinusoidally contoured air-gap, a rotor shaft rotatably supported on said plate, a first rotor on said shaft for rotation within one pair of said pole-pieces, a second rotor on said shaft rotatable within the other pair of said pole-pieces, and a cylindrical diametrically magnetized permanent magnet rotatable within the interposed pole portions of said pole-pieces through a desired angle, whereby the rotation of one of said rotors generates a potential which varies in accordance with the sine of said angle and the rotation of the other of said rotors generates a potential which varies in accordance with the cosine of said angle.

10. A generator for generating potentials which may be caused to vary in accordance with the sine and cosine of an angle comprising a mounting plate, cylindrical hub members secured to the opposite ends of said plate respectively, a tubular member secured to the central portion of said plate, with its axis aligned with the axes of said hub members, a first pair of soft iron pole-pieces each secured at one end to the peripheral surface of one of said hub members and at its other end to the inner surface of said tubular member, a second pair of soft iron pole-pieces each secured at one end to the peripheral surface of the other of said hub members and at its other end to the inner surface of said tubular member, each of the ends of the pole-pieces which is secured to said tubular member being sinusoidally shaped and such shaped ends of one pair of said pole-pieces being interposed between the shaped ends of the other pair of said pole-pieces and separated therefrom by a narrow sinusoidally contoured air-gap, a rotor shaft journaled in said hub members, a first rotor on said shaft for rotation within one pair of said pole-pieces, a second rotor on said shaft for rotation within the other pair of said pole-pieces and a cylindrical diametrically magnetized permanent magnet rotatable within the interposed pole ends of said pole-pieces through a desired angle, whereby the rotation of one of said rotors generates a potential which varies in accordance with the sine of said angle and the rotation of the other of said rotors generates a potential which varies in accordance with the cosine of said angle.

WILLIAM H. T. HOLDEN.
EDMUND R. MORTON.

REFERENCES CITED

The following references are of record in the file of this patent:

UNITED STATES PATENTS

| Number | Name | Date |
|--------|------|------|
| 819,933 | Schneider | May 8, 1906 |

FOREIGN PATENTS

| Number | Country | Date |
|--------|---------|------|
| 233,374 | German | June 20, 1910 |